(No Model.)
L. D. CLAIROUX.
Fruit Gathering Apparatus.
No. 235,413. Patented Dec. 14, 1880.
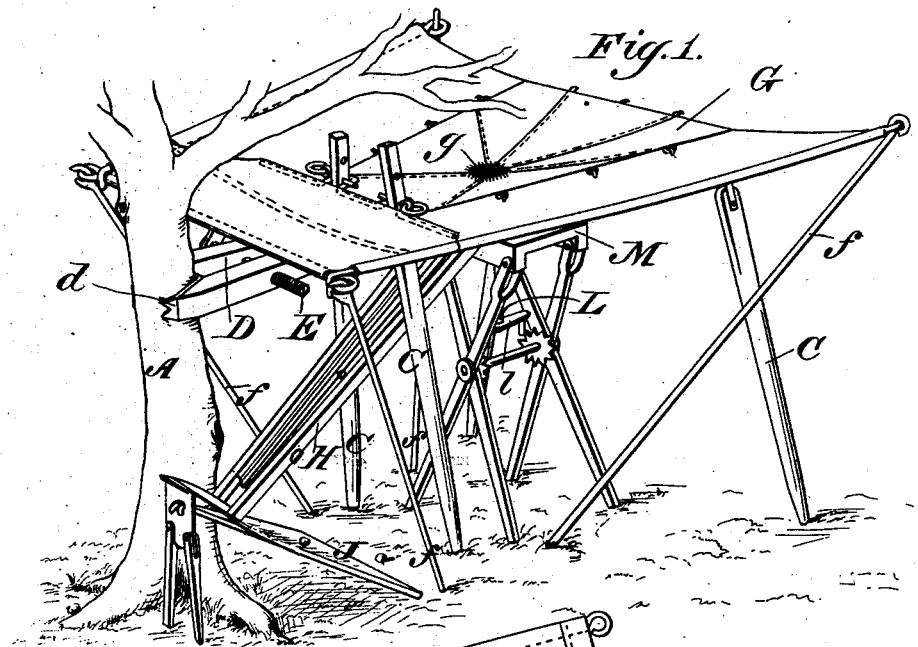
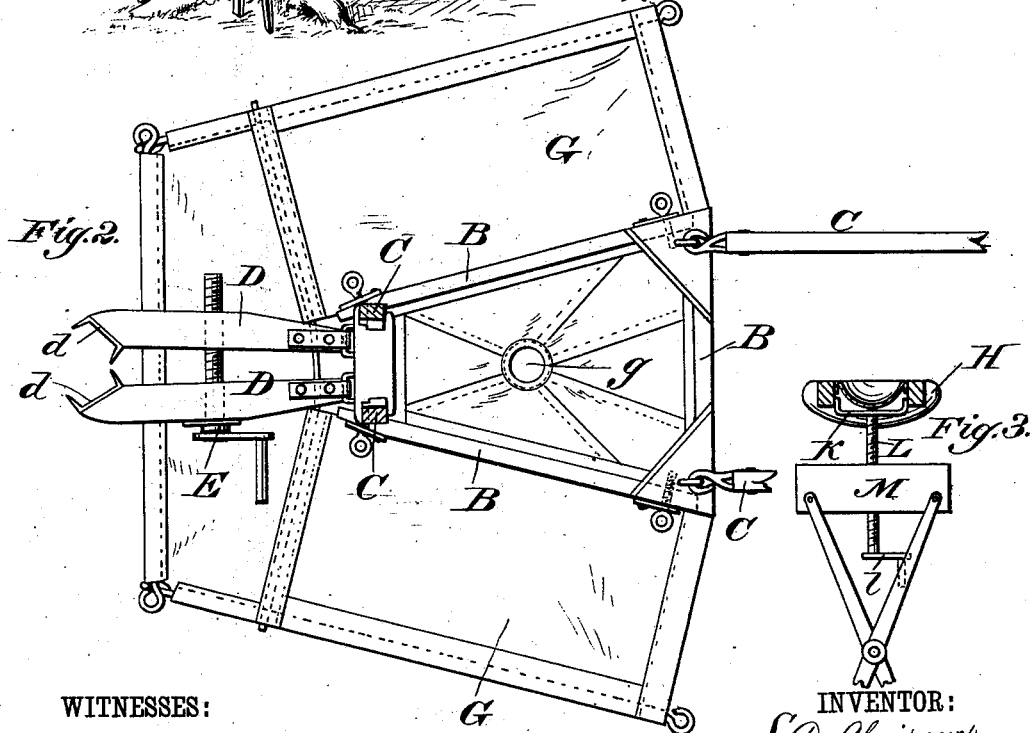
WITNESSES:
Donn P. Twitchell,
C. Sedgwick.
INVENTOR:
L. D. Clairoux.
BY Munn & Co.
ATTORNEYS.

UNITED STATES PATENT OFFICE.

LOUIS D. CLAIROUX, OF DETROIT, MICHIGAN.

FRUIT-GATHERING APPARATUS.

SPECIFICATION forming part of Letters Patent No. 235,413, dated December 14, 1880.

Application filed September 1, 1880. (No model.)

*To all whom it may concern:*

Be it known that I, LOUIS D. CLAIROUX, of Detroit, in the county of Wayne and State of Michigan, have invented a new and useful Improvement in Fruit-Gathering Apparatus, of which the following is a specification.

My invention consists in a novel construction, arrangement, and combination of a framework, apron, trough, and devices connected therewith, whereby provision is made for readily applying the apparatus to a tree and for adjusting it to different positions, as hereinafter more particularly described.

In the accompanying drawings, Figure 1 is a perspective view of an apparatus embodying my improvements. Fig. 2 is an inverted view of the frame-work and apron. Fig. 3 is a detail sectional view.

Similar letters of reference indicate corresponding parts.

A represents the trunk of a tree from which the fruit is to be gathered.

B represents a frame, of either square or approximate rhomboidal form, as may be desired. At the four corners of the frame, hinged or linked thereto, are legs C for supporting it. To the front end of the frame the bars D D have their rear ends hinged, and their front ends are provided with claws $d$ for engagement with the tree A. The two bars D D are connected by a hand-screw, E, passing through them, so that they may be drawn toward each other in order to clamp the tree firmly.

To the frame B is attached an apron, G, which may be of any suitable flexible material. The apron is larger than the frame, extending beyond it on two sides and in front toward the tree A. At the four corners of the apron are props consisting of rods $f$, having their upper ends hinged or linked to the apron and their lower ends adapted to be caught into the ground, so as to stretch the apron and hold it out smooth.

At or near the center of the apron is a concavity or depression which terminates in an opening, $g$. Under this opening is placed the upper end of a trough, H, the lower end of which leads to an adjustable inclined plane, J; or, if desired, the trough H may lead directly to a wagon or other receptacle.

The fruit is gathered by shaking the tree, or by cutting or plucking the fruit in any suitable manner and allowing it to drop on the apron, from whence it passes, through the opening $g$ and the trough H, to the inclined plane J, or to a wagon or other receptacle.

The upper end of the trough is supported by a cross-bar, K, carried by a swivel-joint at the upper end of a screw, L, provided at its lower end with a handle, $l$, for turning it, in order to regulate the height of the trough. The cross-bar K is provided at its ends with spurs for engagement with the trough, which latter may be of any suitable construction and material, but is here shown as consisting of a frame covered with flexible material. The screw L passes through the top of a table, M, which is here shown as consisting of a flat top with crossed legs pivoted thereto.

If desired, the trough H may be dispensed with, and a basket or other vessel may be placed on the table under the opening $g$ for the reception of the fruit.

Having thus fully described my invention, I claim as new, and desire to secure by Letters Patent—

1. The combination of the screw L, having handle $l$, the table M, the trough H, and the swiveled cross-bar K, having end spurs, as and for the purpose specified.

2. The combination, with the frame B and apron G, of the clamping-bars D, provided with the jaws $d$, and connected by the screw E, as shown and described, for the purpose specified.

LOUIS DOSITÉ CLAIROUX.

Witnesses:
J. M. GOODWIN,
J. S. SCHMITTDIE.